US012707221B2

(12) United States Patent
Terentiv et al.

(10) Patent No.: US 12,707,221 B2
(45) **Date of Patent: *Aug. 11, 2026**

(54) METHODS, APPARATUS AND SYSTEMS FOR A PRE-RENDERED SIGNAL FOR AUDIO RENDERING

(71) Applicant: DOLBY INTERNATIONAL AB, Dublin (IE)

(72) Inventors: Leon Terentiv, Erlangen (DE); Christof Fersch, Neumarkt (DE); Daniel Fischer, Fuerth (DE)

(73) Assignee: DOLBY INTERNATIONAL AB, Dublin (IE)

( * ) Notice: Subject to any disclaimer, the term of this patent is extended or adjusted under 35 U.S.C. 154(b) by 377 days.

This patent is subject to a terminal disclaimer.

(21) Appl. No.: 18/145,207

(22) Filed: Dec. 22, 2022

(65) Prior Publication Data

US 2023/0262407 A1 Aug. 17, 2023

Related U.S. Application Data

(63) Continuation of application No. 17/046,295, filed as application No. PCT/EP2019/058833 on Apr. 8, 2019, now Pat. No. 11,540,079.

(Continued)

(51) Int. Cl.
*H04S 7/00* (2006.01)

(52) U.S. Cl.
CPC ........... *H04S 7/303* (2013.01); *H04S 2400/11* (2013.01); *H04S 2420/03* (2013.01)

(58) Field of Classification Search
CPC ......... G06F 3/162; G06F 16/683; G06F 16/68

(Continued)

(56) References Cited

U.S. PATENT DOCUMENTS 9,412,385 B2 8/2016 Sen
11,228,856 B2 1/2022 Jax (Continued)

FOREIGN PATENT DOCUMENTS

CN 104168091 A 11/2014
CN 103701577 B 8/2017

(Continued)

OTHER PUBLICATIONS

Kim, Y.H. "The Spatial Equalizer" 2014 International Conference on Information and Communication Technology Convergence (ICTC), Busan, 2014, pp. 976-981.

*Primary Examiner* — Alexander Krzystan

(57) ABSTRACT

The present disclosure relates to a method of decoding audio scene content from a bitstream by a decoder that includes an audio renderer with one or more rendering tools. The method comprises receiving the bitstream, decoding a description of an audio scene from the bitstream, determining one or more effective audio elements from the description of the audio scene, determining effective audio element information indicative of effective audio element positions of the one or more effective audio elements from the description of the audio scene, decoding a rendering mode indication from the bitstream, wherein the rendering mode indication is indicative of whether the one or more effective audio elements represent a sound field obtained from pre-rendered audio elements and should be rendered using a predetermined rendering mode, and in response to the rendering mode indication indicating that the one or more effective audio elements represent the sound field obtained from pre-rendered audio elements and should be rendered using the predetermined rendering mode, rendering the one or more effective audio elements using the predetermined rendering mode, wherein rendering the one or more effective audio elements using the predetermined rendering mode (Continued)

takes into account the effective audio element information, and wherein the predetermined rendering mode defines a predetermined configuration of the rendering tools for controlling an impact of an acoustic environment of the audio scene on the rendering output. The disclosure further relates to a method of generating audio scene content and a method of encoding audio scene content into a bitstream.

12 Claims, 15 Drawing Sheets

Related U.S. Application Data

(60) Provisional application No. 62/755,957, filed on Nov. 5, 2018, provisional application No. 62/656,163, filed on Apr. 11, 2018.

(58) Field of Classification Search
USPC .............................................. 700/94; 381/22
See application file for complete search history.

(56) References Cited

U.S. PATENT DOCUMENTS

| | | | |
|---|---|---|---|
| 2006/0282262 A1 | 12/2006 | Vos | |
| 2012/0213375 A1 | 8/2012 | Mahabub | |
| 2012/0230497 A1 | 9/2012 | Dressler | |
| 2014/0133683 A1 | 5/2014 | Robinson | |
| 2015/0078594 A1* | 3/2015 | Mcgrath | H04S 3/002 381/300 |
| 2015/0279376 A1 | 10/2015 | Beack | |
| 2016/0080886 A1 | 3/2016 | De Bruijn | |
| 2016/0133263 A1 | 5/2016 | Borss | |
| 2016/0133267 A1 | 5/2016 | Adami | |
| 2016/0142847 A1* | 5/2016 | Disch | H04S 3/00 381/23 |
| 2016/0163321 A1* | 6/2016 | Arnott | G10L 19/167 704/500 |
| 2016/0232901 A1 | 8/2016 | Ghido | |
| 2016/0266865 A1* | 9/2016 | Tsingos | G06F 3/165 |
| 2016/0275957 A1 | 9/2016 | Dick | |
| 2017/0105082 A1 | 4/2017 | Kim | |
| 2017/0150286 A1 | 5/2017 | Sporer | |
| 2017/0312614 A1 | 11/2017 | Tran | |
| 2017/0366914 A1 | 12/2017 | Stein | |
| 2018/0068664 A1 | 3/2018 | Seo | |
| 2018/0091917 A1 | 3/2018 | Chon | |
| 2018/0091919 A1* | 3/2018 | Chon | H04S 7/303 |
| 2020/0252739 A1 | 8/2020 | Eronen | |
| 2021/0120360 A1 | 4/2021 | Terentiv | |

FOREIGN PATENT DOCUMENTS

| | | | |
|---|---|---|---|
| CN | 106603134 | B | 10/2020 |
| EP | 2866227 | | 4/2015 |
| EP | 2930952 | | 10/2015 |
| EP | 3022949 | B1 | 10/2017 |
| JP | 2006074589 | A | 3/2006 |
| JP | 2016521532 | A | 7/2016 |
| JP | 2016538585 | A | 12/2016 |
| KR | 20150100721 | A | 9/2015 |
| KR | 20160073412 | A | 6/2016 |
| RU | 2015153540 | A | 6/2017 |
| WO | 2016208406 | A1 | 12/2016 |
| WO | WO20170035281 | W | 3/2017 |

* cited by examiner

METHODS, APPARATUS AND SYSTEMS FOR A PRE-RENDERED SIGNAL FOR AUDIO RENDERING

CROSS-REFERENCE TO RELATED APPLICATIONS

This application is a continuation of U.S. application Ser. No. 17/046,295, filed 8 Oct. 2020 which is a U.S. National Stage of International Patent Application No. PCT/EP2019/058833, filed Apr. 8, 2019, which claims priority to U.S. provisional application No. 62/656,163 (reference: D18040USP1), filed 11 Apr. 2018 and U.S. provisional application No. 62/755,957 (reference: D18040USP2), filed 5 Nov. 2018, each of which is hereby incorporated by reference in its entirety.

TECHNICAL FIELD

The present disclosure relates to providing an apparatus, system and method for audio rendering.

BACKGROUND

FIG. 1 illustrates an exemplary encoder that is configured to process metadata and audio renderer extensions.

In some cases 6DoF renderers are not capable to reproduce a content creator's desired soundfield in some position(s) (regions, trajectories) in virtual reality/augmented reality/mixed reality (VR/AR/MR) space because there is:

1. insufficient metadata describing sound sources and VR/AR/MR environment; and
2. limited capabilities of 6DoF renderers and resources.

Certain 6DoF renderers (that create sound fields based only on original audio source signals and a VR/AR/MR environment description) may fail to reproduce the intended signal in the desired position(s) due to the following reasons:

- 1.1) bitrate limitations for parametrized information (metadata) describing VR/AR/MR environment and corresponding audio signals;
- 1.2) un-availability of the data for inverse 6DoF rendering (e.g., the reference recordings in one or several points of interest are available, but it is unknown how to recreate this signal by the 6DoF renderer and what data input is needed for that);
- 2.1) artistic intent that may differ from the default (e.g. physical law consistent) output of the 6DoF renderer (e.g., similar to the "artistic downmix" concept); and
- 2.2) capability limitations (e.g., bitrate, complexity, delay, etc. restrictions) on the decoder (6DoF renderer) implementation.

At the same time, one can require that high audio quality (and/or fidelity to the pre-defined reference signal) audio reproduction (i.e., 6DoF renderer output) for given position(s) in VR/AR/MR space. For instance, this may be required for a 3DoF/3DoF+ compatibility constraint or a compatibility demand for different processing modes (e.g., between "base line" mode and "low power" mode that doesn't account for VR/AR/MR geometry influence) of 6DoF renders.

Thus, there is a need for methods of encoding/decoding and corresponding encoders/decoders that improve reproduction of a content creator's desired sound field in VR/AR/MR space.

SUMMARY

An aspect of the disclosure relates to a method of decoding audio scene content from a bitstream by a decoder that includes an audio renderer with one or more rendering tools. The method may include receiving the bitstream. The method may further include decoding a description of an audio scene from the bitstream. The audio scene may include an acoustic environment, such as an VR/AR/MR acoustic environment, for example. The method may further include determining one or more effective audio elements from the description of the audio scene. The method may further include determining effective audio element information indicative of effective audio element positions of the one or more effective audio elements from the description of the audio scene. The method may further include decoding a rendering mode indication from the bitstream. The rendering mode indication may be indicative of whether the one or more effective audio elements represent a sound field obtained from pre-rendered audio elements and should be rendered using a predetermined rendering mode. The method may yet further include, in response to the rendering mode indication indicating that the one or more effective audio elements represent the sound field obtained from pre-rendered audio elements and should be rendered using the predetermined rendering mode, rendering the one or more effective audio elements using the predetermined rendering mode. Rendering the one or more effective audio elements using the predetermined rendering mode may take into account the effective audio element information. The predetermined rendering mode may define a predetermined configuration of the rendering tools for controlling an impact of an acoustic environment of the audio scene on the rendering output. The effective audio elements may be rendered to a reference position, for example. The predetermined rendering mode may enable or disable certain rendering tools. Also, the predetermined rendering mode may enhance acoustics for the one or more effective audio elements (e.g., add artificial acoustics).

The one or more effective audio elements so to speak encapsule an impact of the audio environment, such as echo, reverberation, and acoustic occlusion, for example. This enables use of a particularly simple rendering mode (i.e., the predetermined rendering mode) at the decoder. At the same time, artistic intent can be preserved and the user (listener) can be provided with a rich immersive acoustic experience even for low power decoders. Moreover, the decoder's rendering tools can be individually configured based on the rendering mode indication, which offers for additional control of acoustic effects. Encapsuling the impact of the acoustic environment finally allows for efficient compression of metadata indicating the acoustic environment.

In some embodiments, the method may further include obtaining listener position information indicative of a position of a listener's head in the acoustic environment and/or listener orientation information indicative of an orientation of the listener's head in the acoustic environment. A corresponding decoder may include an interface for receiving the listener position information and/or listener orientation information. Then, rendering the one or more effective audio elements using the predetermined rendering mode may further take into account the listener position information and/or listener orientation information. By referring to this additional information, the user's acoustic experience can be made even more immersive and meaningful.

In some embodiments, the effective audio element information may include information indicative of respective sound radiation patterns of the one or more effective audio elements. Rendering the one or more effective audio elements using the predetermined rendering mode may then further take into account the information indicative of the respective sound radiation patterns of the one or more effective audio elements. For example, an attenuation factor may be calculated based on the sound radiation pattern of a respective effective audio element and a relative arrangement between the respective effective audio element and a listener position. By taking into account radiation patterns, the user's acoustic experience can be made even more immersive and meaningful.

In some embodiments, rendering the one or more effective audio elements using the predetermined rendering mode may apply sound attenuation modelling in accordance with respective distances between a listener position and the effective audio element positions of the one or more effective audio elements. That is, the predetermined rendering mode may not consider any acoustic elements in the acoustic environment and apply (only) sound attenuation modelling (in empty space). This defines a simple rendering mode that can be applied even on low power decoders. In addition, sound directivity modelling may be applied, for example based on sound radiation patterns of the one or more effective audio elements.

In some embodiments, at least two effective audio elements may be determined from the description of the audio scene. Then, the rendering mode indication may indicate a respective predetermined rendering mode for each of the at least two effective audio elements. Further, the method may include rendering the at least two effective audio elements using their respective predetermined rendering modes. Rendering each effective audio element using its respective predetermined rendering mode may take into account the effective audio element information for that effective audio element. Further, the predetermined rendering mode for that effective audio element may define a respective predetermined configuration of the rendering tools for controlling an impact of an acoustic environment of the audio scene on the rendering output for that effective audio element. Thereby, additional control over acoustic effects that are applied to individual effective audio elements can be provided, thus enabling a very close matching to a content creator's artistic intent.

In some embodiments, the method may further include determining one or more original audio elements from the description of the audio scene. The method may further include determining audio element information indicative of audio element positions of the one or more audio elements from the description of the audio scene. The method may yet further include rendering the one or more audio elements using a rendering mode for the one or more audio elements that is different from the predetermined rendering mode used for the one or more effective audio elements. Rendering the one or more audio elements using the rendering mode for the one or more audio elements may take into account the audio element information. Said rendering may further take into account the impact of the acoustic environment on the rendering output. Accordingly, effective audio elements that encapsule the impact of the acoustic environment can be rendered using, e.g., the simple rendering mode, whereas the (original) audio elements can be rendered using a more sophisticated, e.g., reference, rendering mode.

In some embodiments, the method may further include obtaining listener position area information indicative of a listener position area for which the predetermined rendering mode shall be used. The listener position area information may be encoded in the bitstream, for example. Thereby, it can be ensured that the predetermined rendering mode is used only for those listener position areas for which the effective audio element provides a meaningful representation of the original audio scene (e.g., of the original audio elements).

In some embodiments, the predetermined rendering mode indicated by the rendering mode indication may depend on the listener position. Moreover, the method may include rendering the one or more effective audio elements using that predetermined rendering mode that is indicated by the rendering mode indication for the listener position area indicated by the listener position area information. That is, the rendering mode indication may indicate different (predetermined) rendering modes for different listener position areas.

Another aspect of the disclosure relates to a method of generating audio scene content. The method may include obtaining one or more audio elements representing captured signals from an audio scene. The method may further include obtaining effective audio element information indicative of effective audio element positions of one or more effective audio elements to be generated. The method may yet further include determining the one or more effective audio elements from the one or more audio elements representing the captured signals by application of sound attenuation modelling according to distances between a position at which the captured signals have been captured and the effective audio element positions of the one or more effective audio elements.

By this method, audio scene content can be generated that, when rendered to a reference position or capturing position, yields a perceptually close approximation of the sound field that would originate from the original audio scene. In addition however, the audio scene content can be rendered to listener positions that are different from the reference position or capturing position, thus allowing for an immersive acoustic experience.

Another aspect of the disclosure relates to a method of encoding audio scene content into a bitstream. The method may include receiving a description of an audio scene. The audio scene may include an acoustic environment and one or more audio elements at respective audio element positions. The method may further include determining one or more effective audio elements at respective effective audio element positions from the one or more audio elements. This determining may be performed in such manner that rendering the one or more effective audio elements at their respective effective audio element positions to a reference position using a rendering mode that does not take into account an impact of the acoustic environment on the rendering output (e.g., that applies distance attenuation modeling in empty space) yields a psychoacoustic approximation of a reference sound field at the reference position that would result from rendering the one or more audio elements at their respective audio element positions to the reference position using a reference rendering mode that takes into account the impact of the acoustic environment on the rendering output. The method may further include generating effective audio element information indicative of the effective audio element positions of the one or more effective audio elements. The method may further include generating a rendering mode indication that indicates that the one or more effective audio elements represent a sound field obtained from pre-rendered audio elements and should be rendered using a predetermined rendering mode that defines a predetermined configuration of rendering tools of a decoder for controlling an impact of the acoustic environment on the rendering output at the decoder. The method may yet further include encoding the one or more audio elements, the audio element positions, the one or more effective audio elements, the effective audio element information, and the rendering mode indication into the bitstream.

The one or more effective audio elements so to speak encapsule an impact of the audio environment, such as echo, reverberation, and acoustic occlusion, for example. This enables use of a particularly simple rendering mode (i.e., the predetermined rendering mode) at the decoder. At the same time, artistic intent can be preserved and the user (listener) can be provided with a rich immersive acoustic experience even for low power decoders. Moreover, the decoder's rendering tools can be individually configured based on the rendering mode indication, which offers for additional control of acoustic effects. Encapsuling the impact of the acoustic environment finally allows for efficient compression of metadata indicating the acoustic environment.

In some embodiments, the method may further include obtaining listener position information indicative of a position of a listener's head in the acoustic environment and/or listener orientation information indicative of an orientation of the listener's head in the acoustic environment. The method may yet further include encoding the listener position information and/or listener orientation information into the bitstream.

In some embodiments, the effective audio element information may be generated to include information indicative of respective sound radiation patterns of the one or more effective audio elements.

In some embodiments, at least two effective audio elements may be generated and encoded into the bitstream. Then, the rendering mode indication may indicate a respective predetermined rendering mode for each of the at least two effective audio elements.

In some embodiments, the method may further include obtaining listener position area information indicative of a listener position area for which the predetermined rendering mode shall be used. The method may yet further include encoding the listener position area information into the bitstream.

In some embodiments, the predetermined rendering mode indicated by the rendering mode indication may depend on the listener position so that the rendering mode indication indicates a respective predetermined rendering mode for each of a plurality of listener positions.

Another aspect of the disclosure relates to an audio decoder including a processor coupled to a memory storing instructions for the processor. The processor may be adapted to perform the method according respective ones of the above aspects or embodiments.

Another aspect of the disclosure relates to an audio encoder including a processor coupled to a memory storing instructions for the processor. The processor may be adapted to perform the method according respective ones of the above aspects or embodiments.

Further aspects of the disclosure relate to corresponding computer programs and computer-readable storing media.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that respective statements made with regard to the methods likewise apply to the corresponding apparatus, and vice versa.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of an encoder/decoder system, FIG. 2 schematically illustrates an example of an audio scene, FIG. 3 schematically illustrates an example of positions in an acoustic environment of an audio scene, FIG. 4 schematically illustrates an example of an encoder/decoder system according to embodiments of the disclosure, FIG. 5 schematically illustrates another example of an encoder/decoder system according to embodiments of the disclosure.

DETAILED DESCRIPTION

As indicated above, identical or like reference numbers in the disclosure indicate identical or like elements, and repeated description thereof may be omitted for reasons of conciseness.

The present disclosure relates to a VR/AR/MR renderer or an audio renderer (e.g., an audio renderer whose rendering is compatible with the MPEG audio standard). The present disclosure further relates to artistic pre-rendering concepts that provide for a quality and bitrate-efficient representations of a soundfield in encoder pre-defined 3DoF+ region(s).

In one example, a 6DoF audio renderer may output a match to a reference signal (sound field) in a particular position(s). The 6DoF audio renderer may extend converting VR/AR/MR-related metadata to a native format, such as an MPEG-H 3D audio renderer input format.

An aim is to provide an audio renderer that is standard compliant (e.g., compliant with an MPEG standard or compliant with any future MPEG standards) in order to produce audio output as a pre-defined reference signal(s) at a 3DoF position(s)).

A straightforward approach to support such requirements would be to transport the pre-defined (pre-rendered) signal(s) directly to the decoder/renderer side. This approach has the following obvious drawbacks:

1. bitrate increase (i.e. the pre-rendered signal(s) are sent in addition to the original audio source signals); and
2. limited validity (i.e. the pre-rendered signal(s) are valid only for 3DoF position(s)).

Broadly speaking the present disclosure relates to efficiently generating, encoding, decoding and rendering such signal(s) in order to provide 6DoF rendering functionality. Accordingly, the present disclosure describes ways to overcome the aforementioned drawbacks, including:

1. using pre-rendered signal(s) instead of (or as a complimentary addition to) the original audio source signals; and
2. increasing a range of applicability (usage for 6DoF rendering) from 3DoF position(s) to 3DoF+ region for the pre-rendered signal(s), by preserving a high level of a sound field approximation.

Figure 1:
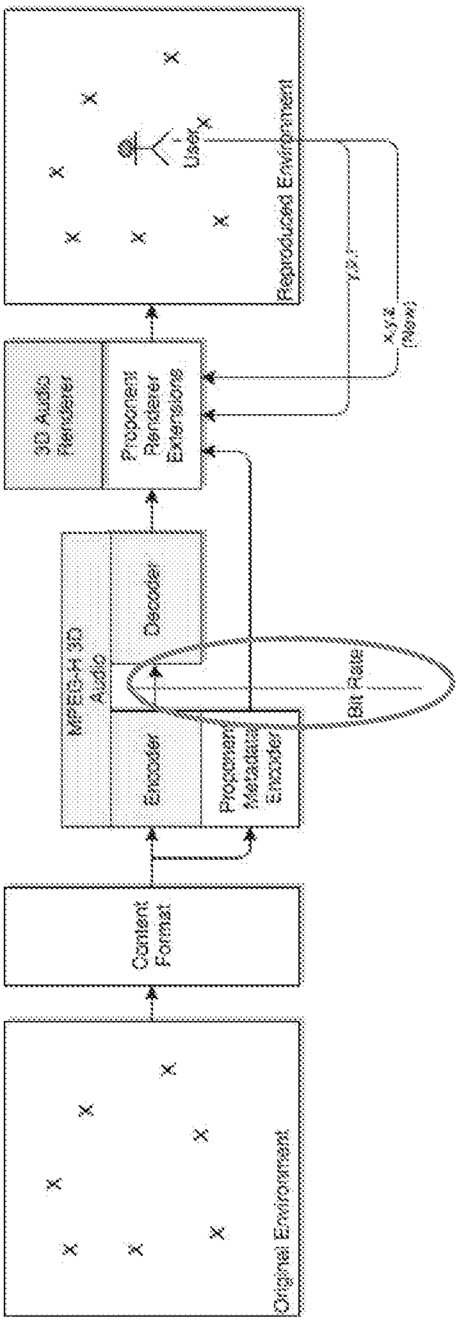
Figure 2:
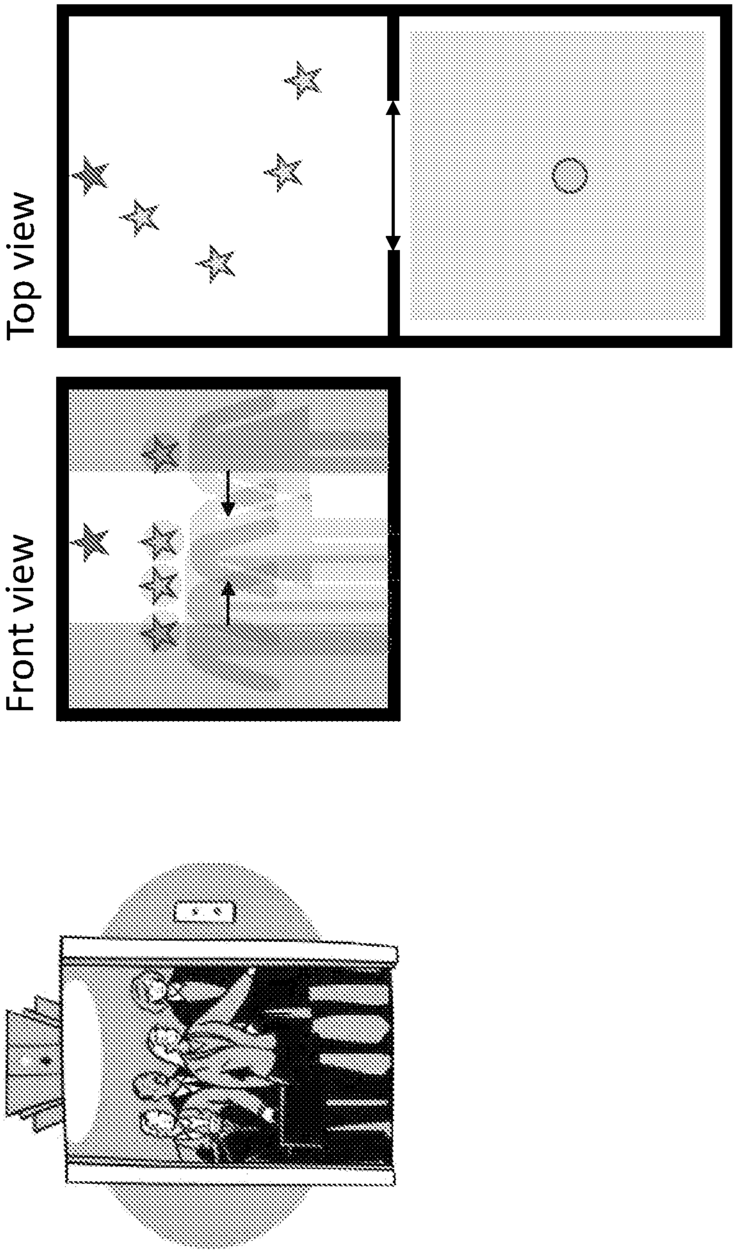

An exemplary scenario to which the present disclosure is applicable is illustrated in FIG. 2. FIG. 2 illustrates an exemplary space, e.g., an elevator and a listener. In one example, a listener may be standing in front of an elevator that opens and closes its doors. Inside of the elevator cabin there are several talking persons and ambient music. The listener can move around, but cannot enter the elevator cabin. FIG. 2 illustrates a top view and a front view of the elevator system.

As such, the elevator and sound sources (persons talking, ambient music) in FIG. 2 may be said to define an audio scene.

In general, an audio scene in the context of this disclosure is understood to mean all audio elements, acoustic elements and acoustic environment which are needed to render the sound in the scene, i.e. the input data needed by the audio renderer (e.g., MPEG-I audio renderer). In the context of the present disclosure, an audio element is understood to mean one or more audio signals and associated metadata. Audio Elements could be audio objects, channels or HOA signals, for example. An audio object is understood to mean an audio signal with associated static/dynamic metadata (e.g., position information) which contains the necessary information to reproduce the sound of an audio source. An acoustic element is understood to mean a physical object in space which interacts with audio elements and impacts rendering of the audio elements based on the user position and orientation. An acoustic element may share metadata with an audio object (e.g., position and orientation). An acoustic environment is understood to mean metadata describing the acoustic properties of the virtual scene to be rendered, e.g. room or locality.

For such a scenario (or any other audio scene in fact), it would be desirable to enable an audio renderer to render a sound field representation of the audio scene that is a faithful representation of the original sound field at least at a reference position, that meets an artistic intent, and/or the rendering of which can be effected with the audio renderer's (limited) rendering capabilities. It is further desirable to meet any bitrate limitations in the transmission of the audio content from an encoder to a decoder.

Figure 3:
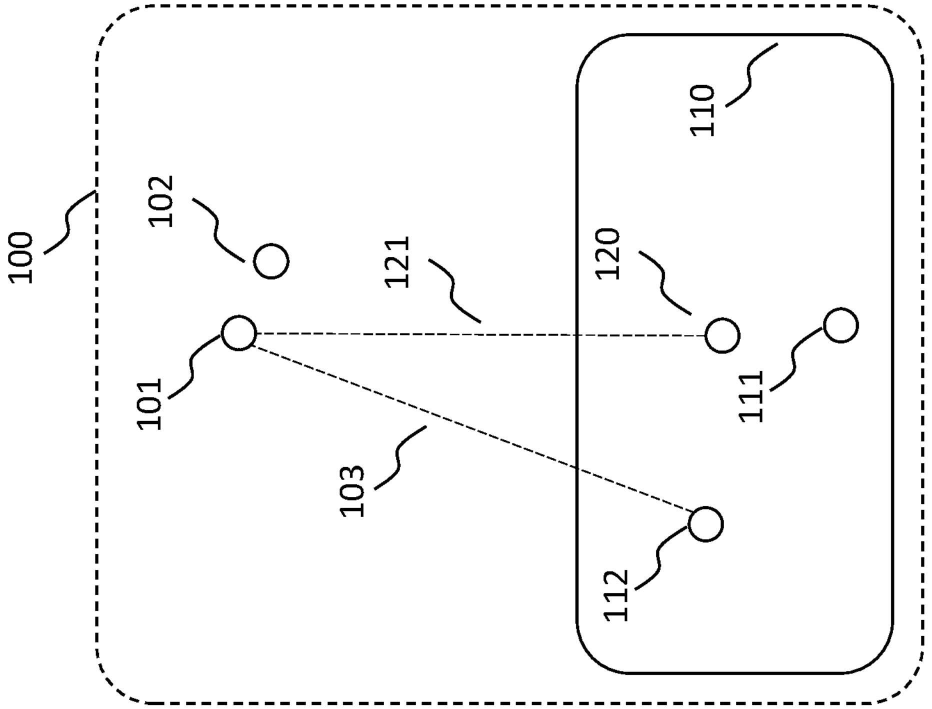

FIG. 3 schematically illustrates an outline of an audio scene in relation to a listening environment. The audio scene comprises an acoustic environment 100. The acoustic environment 100 in turn comprises one or more audio elements 102 at respective positions. The one or more audio elements may be used to generate one or more effective audio elements 101 at respective positions that are not necessarily equal to the position(s) of the one or more audio elements. For example, for a given set of audio elements, the position of an effective audio element may be set to be at a center (e.g., center of gravity) of the positions of the audio elements. The generated effective audio element may have the property that rendering the effective audio element to a reference position 111 in a listener position area 110 with a predetermined rendering function (e.g., a simple rendering function that only applies distance attenuation in empty space) will yield a sound field that is (substantially) perceptually equivalent to the sound field, at the reference position 111, that would result from rendering the audio elements 102 with a reference rendering function (e.g., a rendering function that takes into account characteristics (e.g., an impact) of the acoustic environment including acoustic elements (e.g., echo, reverb, occlusion, etc.). Naturally, once generated, the effective audio elements 101 may also be rendered, using the predetermined rendering function, to a listener position 112 in the listener position area 110 that is different from the reference position 111. The listener position may be at a distance 103 from the position of the effective audio element 101. One example for generating an effective audio element 101 from audio elements 102 will be described in more detail below.

In some embodiments, the effective audio elements 102 may be alternatively determined based on one or more captured signals 120 that are captured at a capturing position in the listener position area 110. For instance, a user in the audience of a musical performance may capture sound emitted from an audio element (e.g., musician) on a stage. Then, given a desired position of the effective audio element (e.g., relative to the capturing position, such as by specifying a distance 121 between the effective audio element 101 and the capturing position, possibly in conjunction with angles indicating the direction of a distance vector between the effective audio element 101 and the capturing position), the effective audio element 101 can be generated based on the captured signal 120. The generated effective audio element 101 may have the property that rendering the effective audio element 101 to a reference position 111 (that is not necessarily equal to the capturing position) with a predetermined rendering function (e.g., a simple rendering function that only applies distance attenuation in empty space) will yield a sound field that is (substantially) perceptually equivalent to the sound field, at the reference position 111, that had originated from the original audio element 102 (e.g., musician). An example of such use case will be described in more detail below.

Notably, the reference position 111 may be the same as the capturing position in some cases, and the reference signal (i.e., the signal at the reference position 111) may be equal to the captured signal 120. This can be a valid assumption for a VR/AR/MR application, where the user may use an avatar in-head recording option. In real-world applications, this assumption may not be valid, since the reference receivers are the user's ears while the signal capturing device (e.g., mobile phone or microphone) may be rather far from the user's ears.

Methods and apparatus for addressing the initially mentioned needs will be described next.

Figure 4:
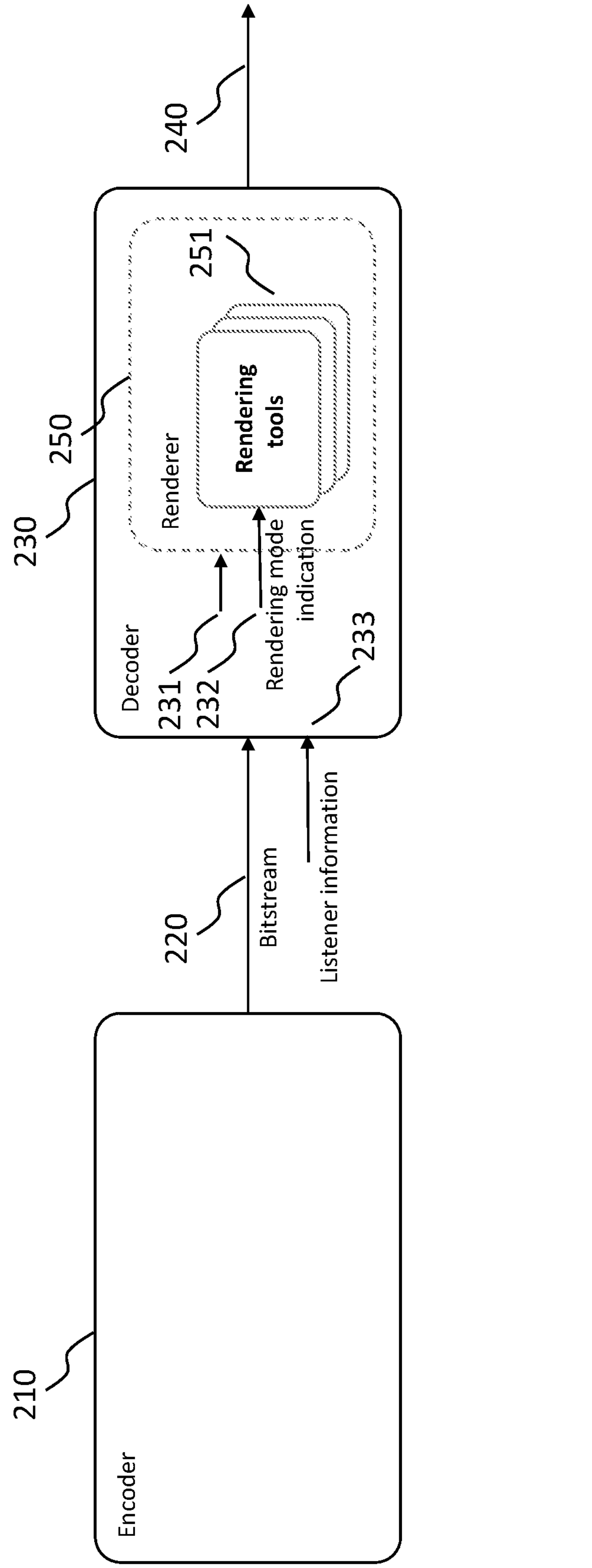

FIG. 4 illustrates an example of an encoder/decoder system according to embodiments of the disclosure. An encoder 210 (e.g., MPEG-I encoder) outputs a bitstream 220 that can be used by a decoder 230 (e.g., MPEG-I decoder) for generating an audio output 240. The decoder 230 can further receive listener information 233. The listener information 233 is not necessarily included in the bitstream 220, but can original from any source. For example, the listener information may be generated and output by a head-tracking device and input to a (dedicated) interface of the decoder 230.

The decoder 230 comprises an audio renderer 250 which in turn comprises one or more rendering tools 251. In the context of the present disclosure, an audio renderer is understood to mean the normative audio rendering module, for example of MPEG-I, including rendering tools and interfaces to external rendering tools and interfaces to system layer for external resources. Rendering tools are understood to mean components of the audio renderer that perform aspects of rendering, e.g. room model parameterization, occlusion, reverberation, binaural rendering, etc.

The renderer 250 is provided with one or more effective audio elements, effective audio element information 231, and a rendering mode indication 232 as inputs. The effective audio elements, the effective audio element information, and the rendering mode indication 232 will be described in more detail below. The effective audio element information 231 and the rendering mode indication 232 can be derived (e.g., determined/decoded) from the bitstream 220. The renderer 250 renders a representation of an audio scene based on the effective audio elements and the effective audio element information, using the one or more rendering tools 251. Therein, the rendering mode indication 232 indicates a rendering mode in which the one or more rendering tools 251 operate. For example, certain rendering tools 251 may be activated or deactivated in accordance with the rendering mode indication 232. Moreover, certain rendering tools 251 may be configured in accordance with the rendering mode indication 232. For example, control parameters of the certain rendering tools 251 may be selected (e.g., set) in accordance with the rendering mode indication 232.

In the context of the present disclosure, the encoder (e.g., MPEG-I encoder) has the tasks of determining the 6DoF metadata and control data, determining the effective audio elements (e.g., including a mono audio signal for each effective audio element), determining positions for effective audio elements (e.g., x, y, z), and determining data for controlling the rendering tools (e.g. enabling/disabling flags and configuration data). The data for controlling the rendering tools may correspond to, include, or be included in, the aforementioned rendering mode indication.

In addition to the above, an encoder according to embodiments of the disclosure may minimize perceptual difference of the output signal 240 in respect to a reference signal R (if existent) for a reference position 111. That is, for a rendering tool/rendering function F( ) to be used by the decoder, a processed signal A, and a position (x, y, z) of an effective audio element, the encoder may implement the following optimization:

$$\{x,y,z;F\}:\|\mathrm{Output}_{(reference\ position)}(F_{(x,y,z)}(A))-R\|_{\mathrm{perceptual}}\rightarrow\min$$

Moreover, an encoder according to embodiments of the disclosure may assign "direct" parts of the processed signal A to the estimated positions of the original objects 102. For the decoder it would mean e.g. that it shall be able to recreate several effective audio elements 101 from the single captured signal 120.

In some embodiments, an MPEG-H 3D audio renderer extended by simple distance modelling for 6DoF may be used, where the effective audio element position is expressed in terms of azimuth, elevation, radius, and the rendering tool F( ) relates to a simple multiplicative object gain modification. The audio element position and the gain can be obtained manually (e.g., by encoder tuning) or automatically (e.g., by a brute-force optimization).

Figure 5:
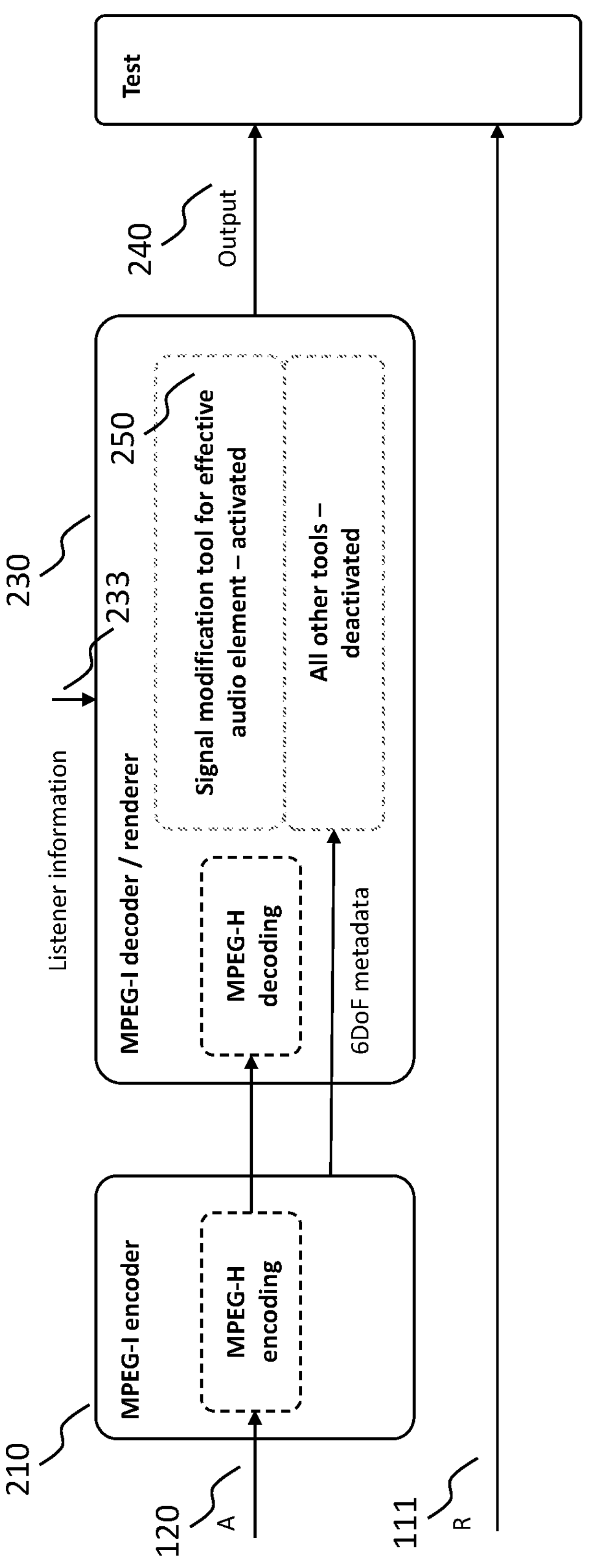

FIG. 5 schematically illustrates another example of an encoder/decoder system according to embodiments of the disclosure.

Figure 10:
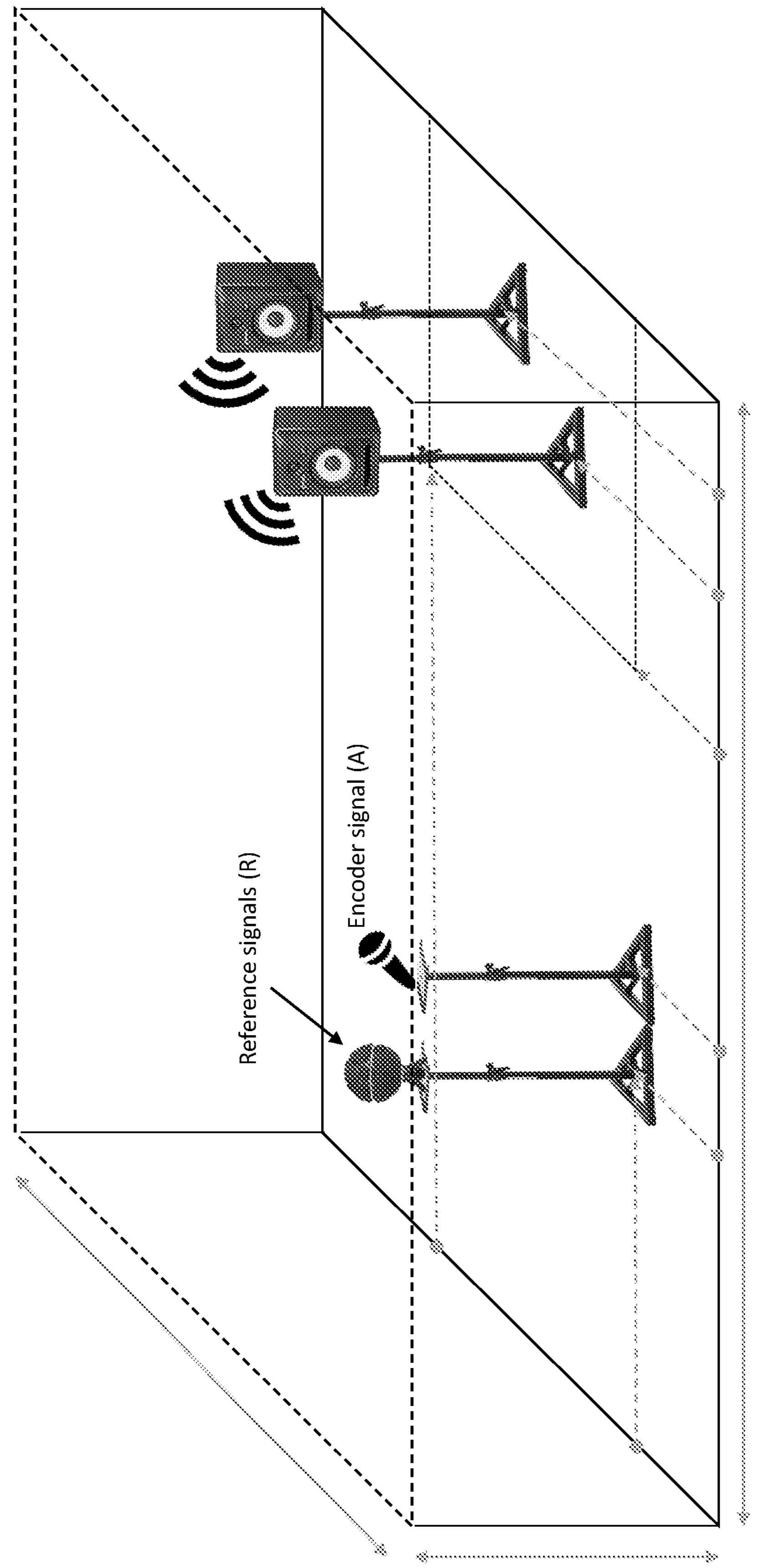

The encoder 210 receives an indication of an audio scene A (a processed signal), which is then subjected to encoding in the manner described in the present disclosure (e.g., MPEG-H encoding). In addition, the encoder 210 may generate metadata (e.g., 6DoF metadata) including information on the acoustic environment. The encoder may yet further generate, possibly as part of the metadata, a rendering mode indication for configuring rendering tools of the audio renderer 250 of the decoder 230. The rendering tools may include, for example, a signal modification tool for effective audio elements. Depending on the rendering mode indication, particular rendering tools of the audio renderer may be activated or deactivated. For example, if the rendering mode indication indicates that an effective audio element is to be rendered, the signal modification tool may be activated, whereas all other rendering tools are deactivated. The decoder 230 outputs the audio output 240, which can be compared to a reference signal R that would result from rendering the original audio elements to the reference position 111 using a reference rendering function. An example of an arrangement for comparing the audio output 240 to the reference signal R is schematically illustrated in FIG. 10.

Figure 6:
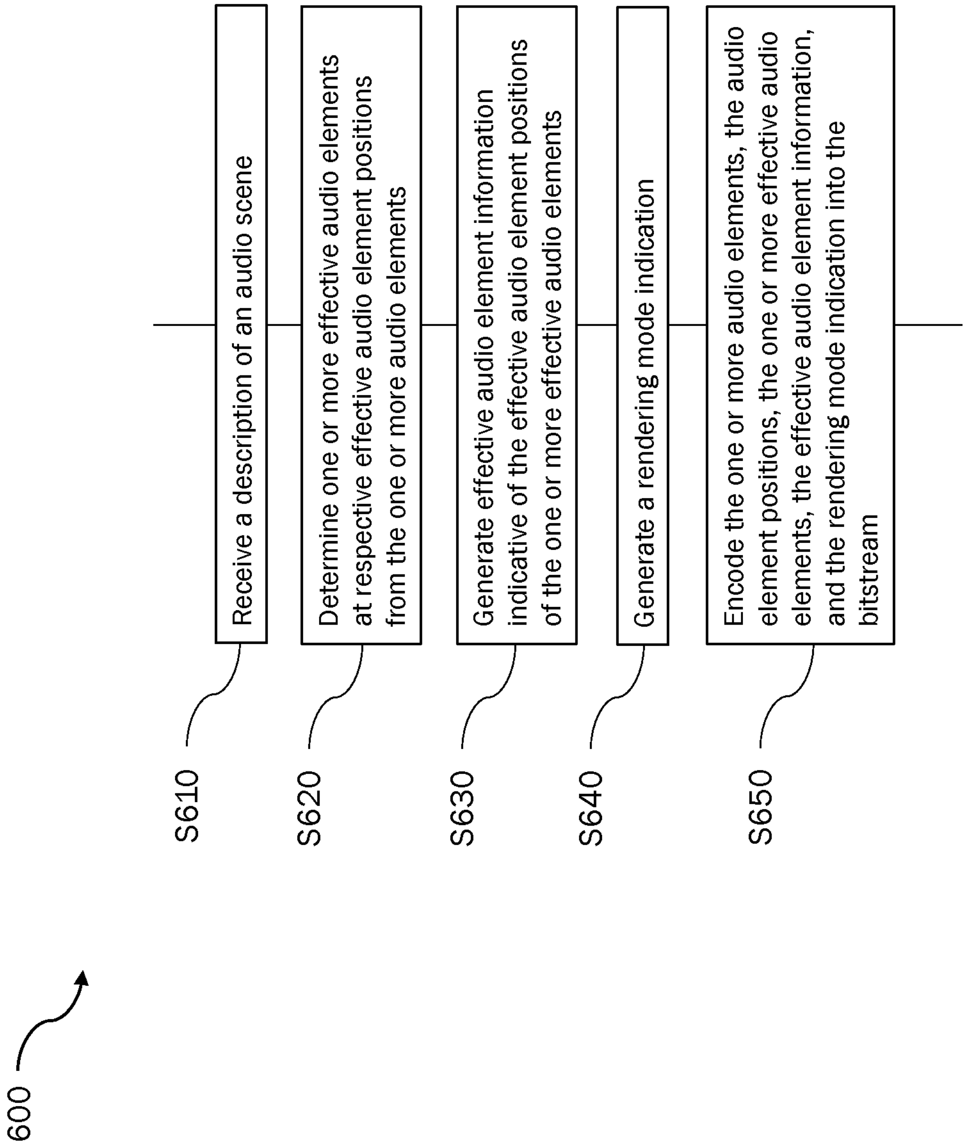
FIG. 6 is a flowchart schematically illustrating an example of a method of encoding audio scene content according to embodiments of the disclosure.

FIG. 6 is a flowchart illustrating an example of a method 600 of encoding audio scene content into a bitstream according to embodiments of the disclosure.

At step S610, a description of an audio scene is received. The audio scene comprises an acoustic environment and one or more audio elements at respective audio element positions.

At step S620, one or more effective audio elements at respective effective audio element positions are determined from the one or more audio elements. The one or more effective audio elements are determined in such manner that rendering the one or more effective audio elements at their respective effective audio element positions to a reference position using a rendering mode that does not take into account an impact of the acoustic environment on the rendering output yields a psychoacoustic approximation of a reference sound field at the reference position that would result from rendering the one or more (original) audio elements at their respective audio element positions to the reference position using a reference rendering mode that takes into account the impact of the acoustic environment on the rendering output. The impact of the acoustic environment may include echo, reverb, reflection, etc. The rendering mode that does not take into account an impact of the acoustic environment on the rendering output may apply distance attenuation modeling (in empty space). A non-limiting example of a method of determining such effective audio elements will be described further below.

At step S630, effective audio element information indicative of the effective audio element positions of the one or more effective audio elements is generated.

At step S640, a rendering mode indication is generated that indicates that the one or more effective audio elements represent a sound field obtained from pre-rendered audio elements and should be rendered using a predetermined rendering mode that defines a predetermined configuration of rendering tools of a decoder for controlling an impact of the acoustic environment on the rendering output at the decoder.

At step S650, the one or more audio elements, the audio element positions, the one or more effective audio elements, the effective audio element information, and the rendering mode indication are encoded into the bitstream.

In the simplest case, the rendering mode indication may be a flag indicating that all acoustics (i.e., impact of the acoustic environment) are included (i.e., encapsuled) in the one or more effective audio elements. Accordingly, the rendering mode indication may be an indication for the decoder (or audio renderer of the decoder) to use a simple rendering mode in which only distance attenuation is applied (e.g., by multiplication with a distance-dependent gain) and all other rendering tools are deactivated. In more sophisticated cases, the rendering mode indication may include one or more control vales for configuring the rendering tools. This may include activation and deactivation of individual rendering tools, but also more fine grained control of the rendering tools. For example, the rendering tools may be configured by the rendering mode indication to enhance acoustics when rendering the one or more effective audio elements. This may be used to add (artificial) acoustics such as echo, reverb, reflection, etc., for example in accordance with an artistic intent (e.g., of a content creator).

In other words, the method 600 may relate to a method of encoding audio data, the audio data representing one or more audio elements at respective audio element positions in an acoustic environment that includes one or more acoustic elements (e.g., representations of physical objects). This method may include determining an effective audio element at an effective audio element position in the acoustic environment, in such manner that rendering the effective audio element to a reference position when using a rendering function that takes into account distance attenuation between the effective audio element position and the reference position, but does not take into account the acoustic elements in the acoustic environment, approximates a reference sound field at the reference position that would result from reference rendering of the one or more audio elements at their respective audio element positions to the reference position. The effective audio element and the effective audio element position may then be encoded into the bitstream.

In the above situation, determining the effective audio element at the effective audio element position may involve rendering the one or more audio elements to the reference position in the acoustic environment using a first rendering function, thereby obtaining the reference sound field at the reference position, wherein the first rendering function takes into account the acoustic elements in the acoustic environment as well as distance attenuation between the audio element positions and the reference position, and determining, based on the reference sound field at the reference position, the effective audio element at the effective audio element position in the acoustic environment, in such manner that rendering the effective audio element to the reference position using a second rendering function would yield a sound field at the reference position that approximates the reference sound field, wherein the second rendering function takes into account distance attenuation between the effective audio element position and the reference position, but does not take into account the acoustic elements in the acoustic environment.

The method 600 described above may relate to a 0DoF use case without listener data. In general, the method 600 supports the concept of a "smart" encoder and a "simple" decoder.

As regards the listener data, the method 600 in some implementations may comprise obtaining listener position information indicative of a position of a listener's head in the acoustic environment (e.g., in the listener position area). Additionally or alternatively, the method 600 may comprise obtaining listener orientation information indicative of an orientation of the listener's head in the acoustic environment (e.g., in the listener position area). The listener position information and/or listener orientation information may then be encoded into the bitstream. The listener position information and/or listener orientation information can be used by the decoder to accordingly render the one or more effective audio elements. For example, the decoder can render the one or more effective audio elements to an actual position of the listener (as opposed to the reference position). Likewise, especially for headphone applications, the decoder can perform a rotation of the rendered sound field in accordance with the orientation of the listener's head.

In some implementations, the method 600 can generate the effective audio element information to comprise information indicative of respective sound radiation patterns of the one or more effective audio elements. This information may then be used by the decoder to accordingly render the one or more effective audio elements. For example, when rendering the one or more effective audio elements, the decoder may apply a respective gain to each of the one or more effective audio elements. These gains may be determined based on respective radiation patterns. Each gain may be determined based on an angle between the distance vector between the respective effective audio element and the listener position (or reference position, if rendering to the reference position is performed) and a radiation direction vector indicating a radiation direction of the respective audio element. For more complex radiation patterns with multiple radiation direction vectors and corresponding weighting coefficients, the gain may be determined based on by a weighted sum of gains, each gain determined based on the angle between the distance vector and the respective radiation direction vector. The weights in the sum may correspond to the weighting coefficients. The gain determined based on the radiation pattern may add to the distance attenuation gain applied by the predetermined rendering mode.

In some implementations, at least two effective audio elements may be generated and encoded into the bitstream. Then, the rendering mode indication may indicate a respective predetermined rendering mode for each of the at least two effective audio elements. The at least two predetermined rendering modes may be distinct. Thereby, different amounts of acoustic effects can be indicated for different effective audio elements, for example in accordance with artistic intent of a content creator.

In some implementations, the method 600 may further comprise obtaining listener position area information indicative of a listener position area for which the predetermined rendering mode shall be used. This listener position area information can then be encoded into the bitstream. At the decoder, the predetermined rendering mode should be used if the listener position to which rendering is desired is within the listener position area indicated by the listener position area information. Otherwise, the decoder can apply a rendering mode of its choosing, such as a default rendering mode, for example.

Further, different predetermined rendering modes may be foreseen in dependence on a listener position to which rendering is desired. Thus, the predetermined rendering mode indicated by the rendering mode indication may depend on the listener position so that the rendering mode indication indicates a respective predetermined rendering mode for each of a plurality of listener positions. Likewise, different predetermined rendering modes may be foreseen in dependence on a listener position area to which rendering is desired. Notably, there may be different effective audio elements for different listener positions (or listener position areas). Providing such a rendering mode indication allows control of (artificial) acoustics, such as (artificial) echo, reverb, reflection, etc., that are applied for each listener position (or listener position area).

Figure 7:
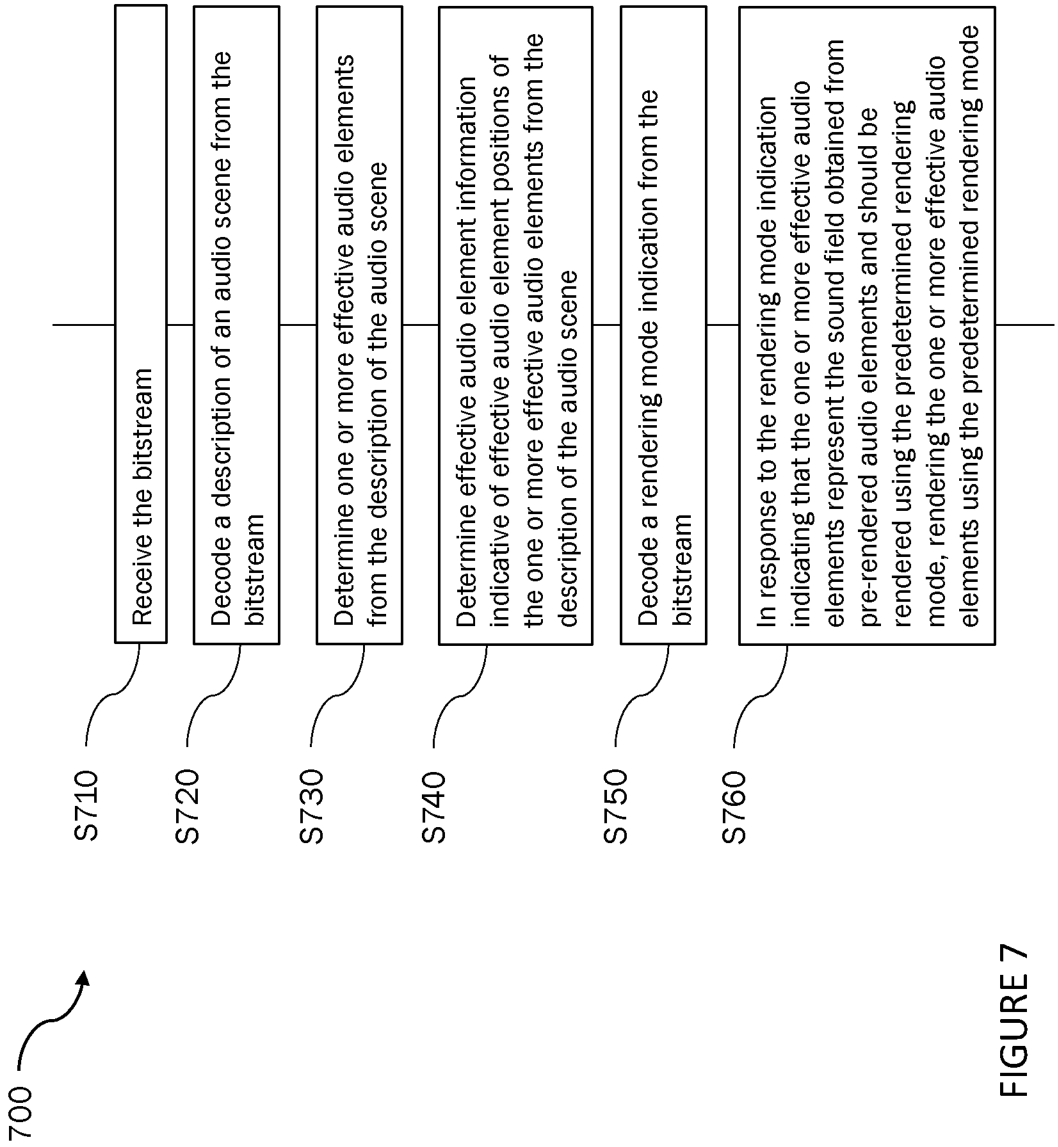
FIG. 7 is a flowchart schematically illustrating an example of a method of decoding audio scene content according to embodiments of the disclosure.

FIG. 7 is a flowchart illustrating an example of a corresponding method 700 of decoding audio scene content from a bitstream by a decoder according to embodiments of the disclosure. The decoder may include an audio renderer with one or more rendering tools.

At step S710, the bitstream is received. At step S720, a description of an audio scene is decoded from the bitstream. At step S730, one or more effective audio elements are determined from the description of the audio scene.

At step S740, effective audio element information indicative of effective audio element positions of the one or more effective audio elements is determined from the description of the audio scene.

At step S750, a rendering mode indication is decoded from the bitstream. The rendering mode indication is indicative of whether the one or more effective audio elements represent a sound field obtained from pre-rendered audio elements and should be rendered using a predetermined rendering mode.

At step S760, in response to the rendering mode indication indicating that the one or more effective audio elements represent the sound field obtained from pre-rendered audio elements and should be rendered using the predetermined rendering mode, the one or more effective audio elements are rendered using the predetermined rendering mode. Rendering the one or more effective audio elements using the predetermined rendering mode takes into account the effective audio element information. Moreover, the predetermined rendering mode defines a predetermined configuration of the rendering tools for controlling an impact of an acoustic environment of the audio scene on the rendering output.

In some implementations, the method 700 may comprise obtaining listener position information indicative of a position of a listener's head in the acoustic environment (e.g., in the listener position area) and/or listener orientation information indicative of an orientation of the listener's head in the acoustic environment (e.g., in the listener position area). Then, rendering the one or more effective audio elements using the predetermined rendering mode may further take into account the listener position information and/or listener orientation information, for example in the manner indicated above with reference to method 600. A corresponding decoder may comprise an interface for receiving the listener position information and/or listener orientation information.

In some implementations of method 700, the effective audio element information may comprise information indicative of respective sound radiation patterns of the one or more effective audio elements. The rendering the one or more effective audio elements using the predetermined rendering mode may then further take into account the information indicative of the respective sound radiation patterns of the one or more effective audio elements, for example in the manner indicated above with reference to method 600.

In some implementations of method 700, rendering the one or more effective audio elements using the predetermined rendering mode may apply sound attenuation modelling (in empty space) in accordance with respective distances between a listener position and the effective audio element positions of the one or more effective audio elements. Such predetermined rendering mode would be referred to as a simple rendering mode. Applying the simple rendering mode (i.e., only distance attenuation in empty space) is possible, since the impact of the acoustic environment is "encapsuled" in the one or more effective audio elements. By doing so, part of the decoder's processing load can be delegated to the encoder, allowing rendering of a immersive sound field in accordance with an artistic intent even by low power decoders.

In some implementations of method 700, at least two effective audio elements may be determined from the description of the audio scene. Then, the rendering mode indication may indicate a respective predetermined rendering mode for each of the at least two effective audio elements. In such situation, the method 700 may further comprise rendering the at least two effective audio elements using their respective predetermined rendering modes. Rendering each effective audio element using its respective predetermined rendering mode may take into account the effective audio element information for that effective audio element, and the rendering mode for that effective audio element may define a respective predetermined configuration of the rendering tools for controlling an impact of an acoustic environment of the audio scene on the rendering output for that effective audio element. The at least two predetermined rendering modes may be distinct. Thereby, different amounts of acoustic effects can be indicated for different effective audio elements, for example in accordance with artistic intent of a content creator.

In some implementations, both effective audio elements and (actual/original) audio elements may be encoded in the bitstream to be decoded. Then, the method 700 may comprise determining one or more audio elements from the description of the audio scene and determining audio element information indicative of audio element positions of the one or more audio elements from the description of the audio scene. Rendering the one or more audio elements is then performed using a rendering mode for the one or more audio elements that is different from the predetermined rendering mode used for the one or more effective audio elements. Rendering the one or more audio elements using the rendering mode for the one or more audio elements may take into account the audio element information. This allows to render effective audio elements with, e.g., the simple rendering mode, while rendering the (actual/original) audio elements with, e.g., the reference rendering mode. Also, the predetermined rendering mode can be configured separately from the rendering mode used for the audio elements. More generally, rendering modes for audio elements and effective audio elements may imply different configurations of the rendering tools involved. Acoustic rendering (that takes into account an impact of the acoustic environment) may be applied to the audio elements, whereas distance attenuation modeling (in empty space) may be applied to the effective audio elements, possibly together with artificial acoustic (that are not necessarily determined by the acoustic environment assumed for encoding).

In some implementations, method 700 may further comprise obtaining listener position area information indicative of a listener position area for which the predetermined rendering mode shall be used. For rendering to a listening position indicated by the listener position area information within the listener position area the predetermined rendering mode should be used. Otherwise, the decoder can apply a rendering mode of its choosing (which may be implementation dependent), such as a default rendering mode, for example.

In some implementation of method 700, the predetermined rendering mode indicated by the rendering mode indication may depend on the listener position (or listener position area). Then, the decoder may perform rendering the one or more effective audio elements using that predetermined rendering mode that is indicated by the rendering mode indication for the listener position area indicated by the listener position area information.

Figure 8:
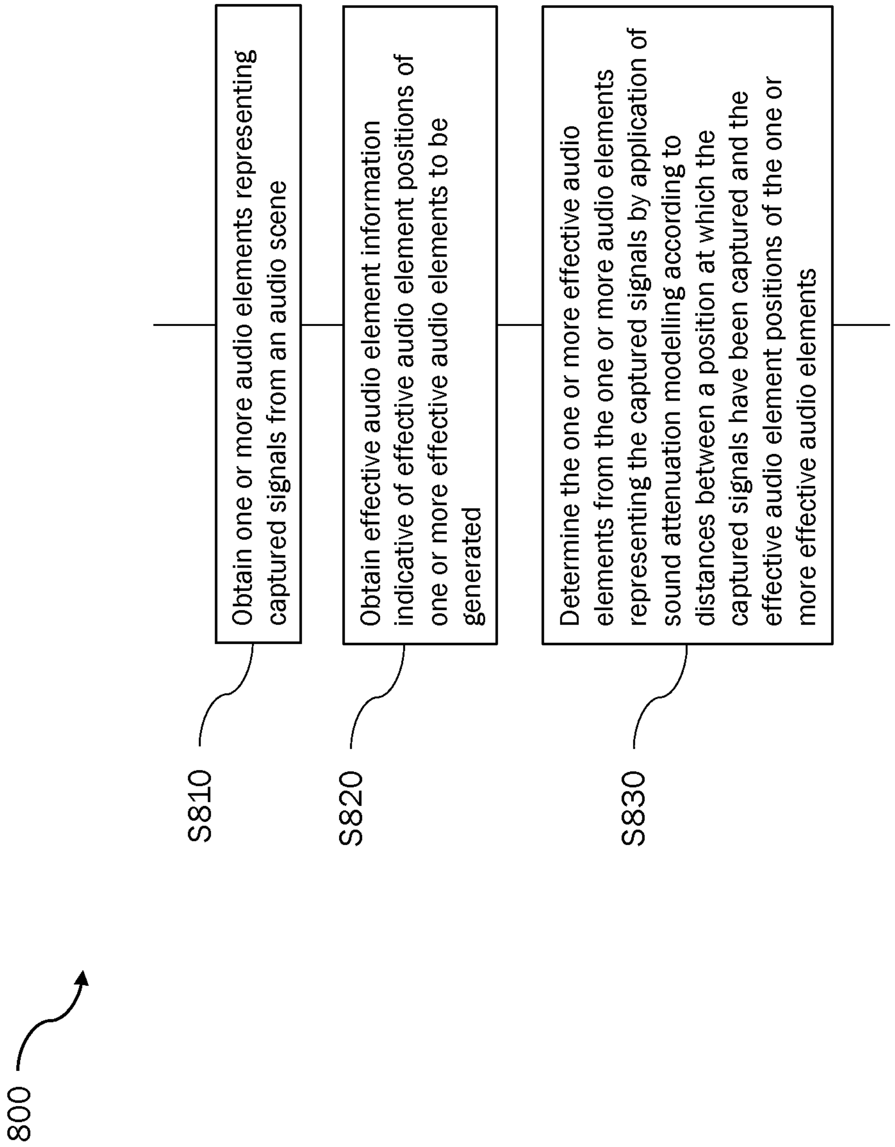
FIG. 8 is a flowchart schematically illustrating an example of a method of generating audio scene content according to embodiments of the disclosure, FIG. 9 schematically illustrates an example of an environment in which the method of FIG. 8 can be performed, FIG. 10 schematically illustrates an example of an environment for testing an output of a decoder according to embodiments of the disclosure, FIG. 11A schematically illustrates an example of data elements transported in the bitstream according to embodiments of the disclosure and FIG. 11B schematically illustrates the data elements that would be transported in the bitstream in conventional encoding/decoding systems, FIG. 12 schematically illustrates examples of different rendering modes with reference to an audio scene, FIG. 13 schematically illustrates examples of encoder and decoder processing according to embodiments of the disclosure with reference to an audio scene, FIG. 14 schematically illustrates examples of rendering an effective audio element to different listener positions according to embodiments of the disclosure, and FIG. 15 schematically illustrates an example of audio elements, effective audio elements, and listener positions in an acoustic environment according to embodiments of the disclosure.

FIG. 8 is a flowchart illustrating an example of a method 800 of generating audio scene content.

At step S810 one or more audio elements representing captured signals from an audio scene are obtained. This may be done for example by sound capturing, e.g., using a microphone or a mobile device having recording capability.

At step S820, effective audio element information indicative of effective audio element positions of one or more effective audio elements to be generated is obtained. The effective audio element positions may be estimated or may be received as a user input.

At step S830, the one or more effective audio elements are determined from the one or more audio elements representing the captured signals by application of sound attenuation modelling according to distances between a position at which the captured signals have been captured and the effective audio element positions of the one or more effective audio elements.

Figure 9:
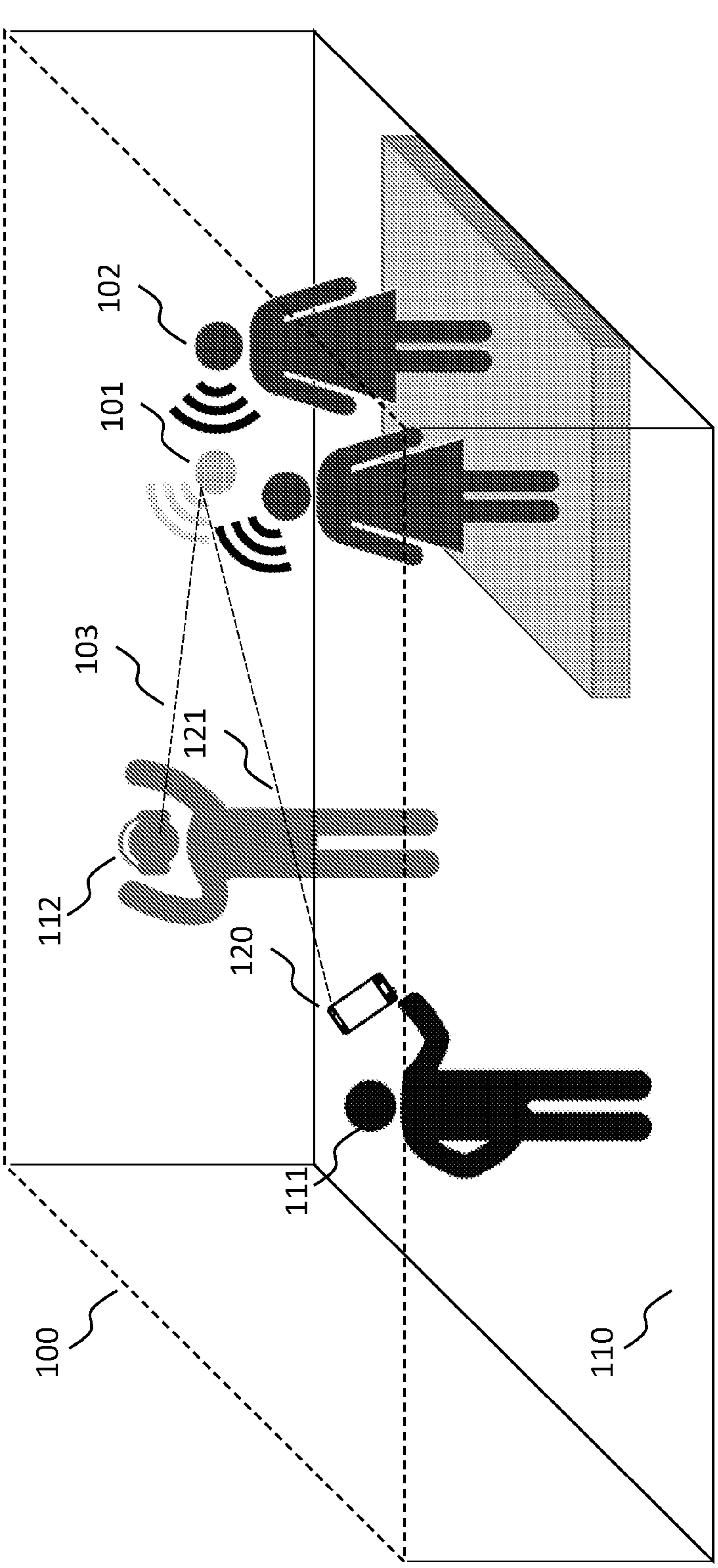

Method 800 enables real-world A(/V) recording of captured audio signals 120 representing audio elements 102 from a discrete capturing position (see FIG. 3). Methods and apparatus according to the present disclosure shall enable consumption of this material from the reference position 111 or other positions 112 and orientations (i.e., in a 6DoF framework) within the listener position area 110 (e.g., with as meaningful a user experience as possible, using 3DoF+, 3DoF, 0DoF platforms, for example). This is schematically illustrated in FIG. 9.

One non-limiting example for determining the effective audio elements from (actual/original) audio elements in an audio scene will be described next.

As has been indicated above, embodiments of the present disclosure relate to recreating the sound field in the "3DoF position" in a way that corresponds to a pre-defined reference signal (that may or may not be consistent to physical laws of sound propagation). This sound field should be based on all original "audio sources" (audio elements) and reflect the influence of the complex (and possibly dynamically changing) geometry of the corresponding acoustic environment (e.g., VR/AR/MR environment, i.e., "doors", "walls", etc.). For example, in reference to the example in FIG. 2, the sound field may relate to all the sound sources (audio elements) inside the elevator.

Moreover, the corresponding renderer (e.g., 6DoF renderer) output sound field should be recreated sufficiently well, in order to provide a high level of VR/AR/MR immersion for a "6DoF space."

Accordingly, embodiments of the disclosure relate to, instead of rendering several original audio objects (audio elements) and accounting for the complex acoustic environment influence, introducing virtual audio object(s) (effective audio elements) that are pre-rendered at the encoder, representing an overall audio scene (i.e., taking into account an impact of an acoustic environment of the audio scene). All effects of the acoustic environment (e.g., acoustical occlusion, reverberation, direct reflection, echo, etc.) are captured directly in the virtual object (effective audio element) waveform that is encoded and transmitted to the renderer (e.g., 6DoF renderer).

The corresponding decoder-side renderer (e.g., 6DoF renderer) may operate in a "simple rendering mode" (with no VR/AR/MR environment consideration) in the whole 6DoF space for such object types (element types). The simple rendering mode (as an example of the above predetermined rendering mode) may only take into account distance attenuation (in empty space), but may not take into account effects of the acoustic environment (e.g., of acoustic element in the acoustic environment), such as reverberation, echo, direct reflection, acoustic occlusion, etc.

In order to extend the applicability range of the predefined reference signal, the virtual object(s) (effective audio elements) may be placed to specific positions in the acoustic environment (VR/AR/MR space) (e.g. at the center of sound intensity of the original audio scene or of the original audio elements). This position can be determined at the encoder automatically by inverse audio rendering or manually specified by a content provider. In this case, the encoder only transports:

1.b) a flag signaling the "pre-rendered type" of the virtual audio object (or in general, the rendering mode indication);
2.b) a virtual audio object signal (an effective audio element) obtained from at least a pre-rendered reference (e.g., mono object); and
3.b) coordinates of the "3DoF position" and a description of the "6DoF space" (e.g., effective audio element information including effective audio element positions)

The pre-defined reference signal for the conventional approach is not the same as the virtual audio object signal (2.b) for the proposed approach. Namely, the "simple" 6DoF rendering of virtual audio object signal (2.b) should approximate the pre-defined reference signal as good as possible for the given "3DoF position(s)".

In one example, the following encoding method may be performed by an audio encoder:

1. determination of the desired "3DoF position(s)" and the corresponding "3DoF+ region(s)" (e.g., listener positions and/or listener position areas to which rendering is desired)
2. reference rendering (or direct recording) for these "3DoF position(s)"
3. inverse audio rendering, determination of signal(s) and position(s) of the virtual audio object(s) (effective audio elements) that result in the best possible approximation of the obtained reference signal(s) in the "3DoF position(s)"
4. encoding of the resulting virtual audio object(s) (effective audio elements) and its/their position(s) together with signaling of the corresponding 6DoF space (acoustic environment) and "pre-rendered object" attributes enabling the "simple rendering mode" of the 6DoF renderer (e.g., the rendering mode indication)

The inverse audio rendering (see item 3 above) complexity directly correlates to 6DoF processing complexity of the "simple rendering mode" of the 6DoF renderer. Moreover, this processing happens at the encoder side that is assumed to have less limitation in terms of computational power.

Figure 11A:
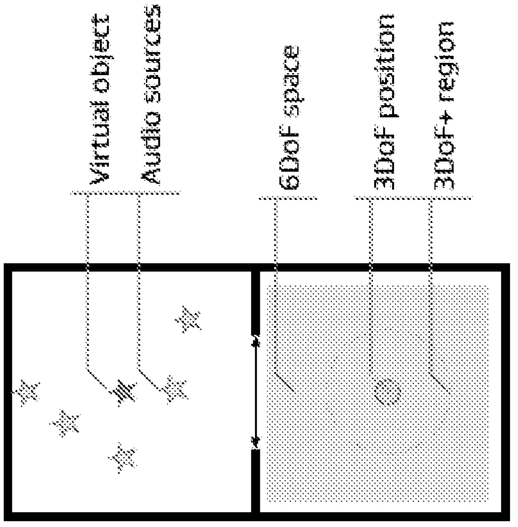
Figure 11B:
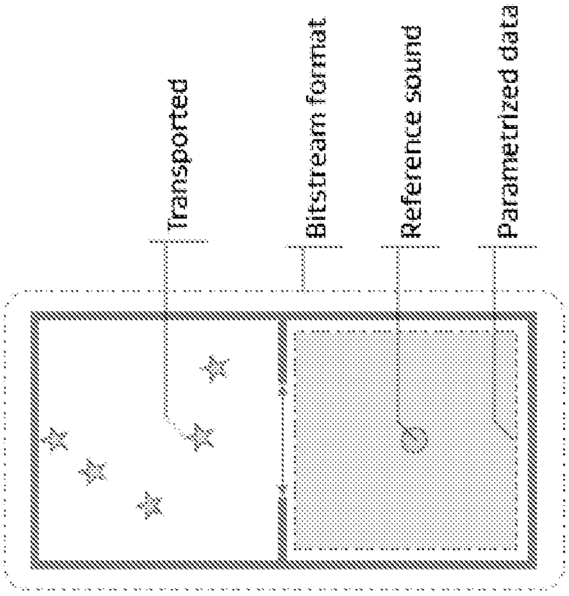

Examples of data elements that need to be transported in the bitstream are schematically illustrated in FIG. 11A. FIG. 11B schematically illustrates the data elements that would be transported in the bitstream in conventional encoding/decoding systems.

Figure 12:
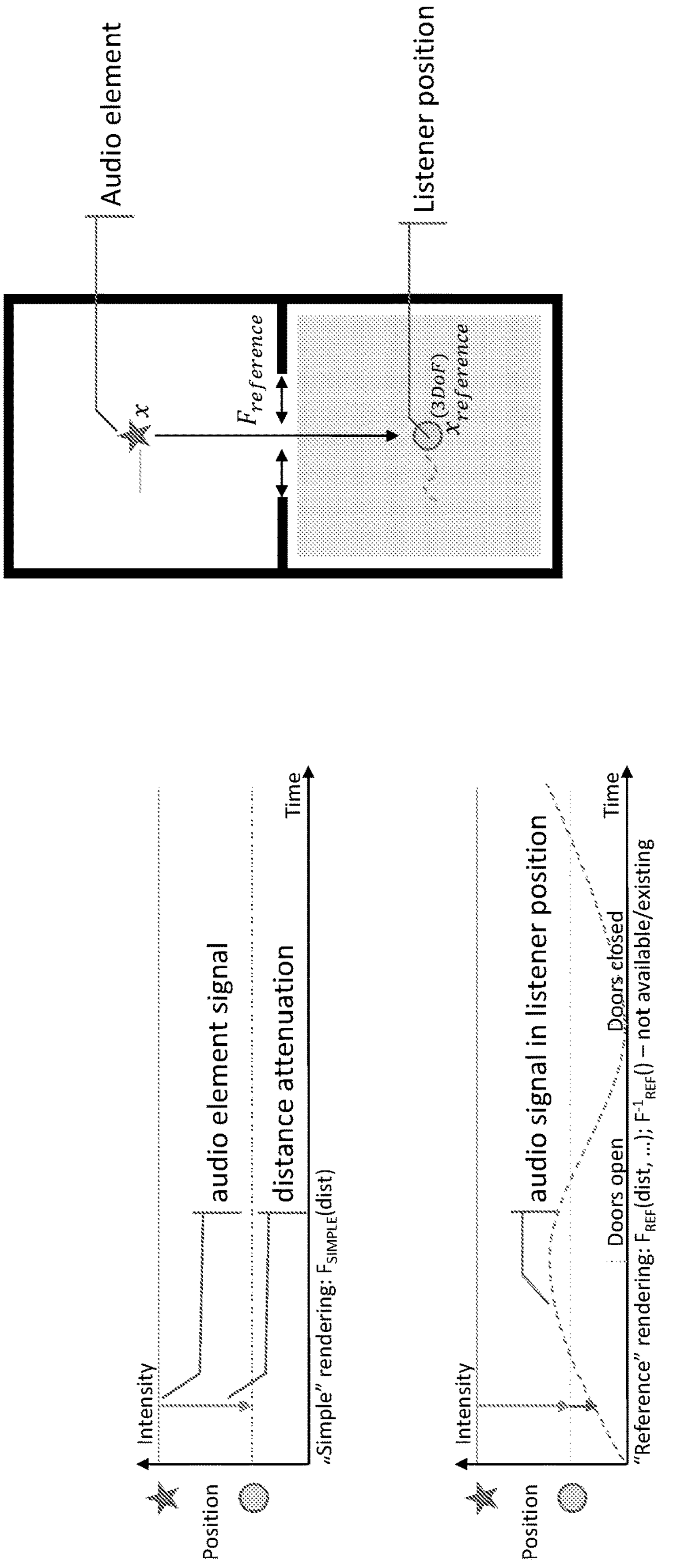

FIG. 12 illustrates the use-cases of direct "simple" and "reference" rendering modes. The left-hand side of FIG. 12 illustrates the operation of the aforementioned rendering modes, and the right-hand side schematically illustrates the rendering of an audio object to a listener position using either rendering mode (based on the example of FIG. 2).

The "simple rendering mode" may not account for acoustic environment (e.g., acoustic VR/AR/MR environment). That is, the simple rendering mode may account only for distance attenuation (e.g., in empty space). For example, as shown in the upper panel on the left-hand side of FIG. 12, in the simple rendering mode $F_{simple}$ only accounts for distance attenuation, but fails to account for the effects of the VR/AR/MR environment, such as the door opening and closing (see, e.g., FIG. 2).

The "reference rendering mode" (lower panel on the left-hand side of FIG. 12) may account for some or all VR/AR/MR environmental effects.

Figure 13:
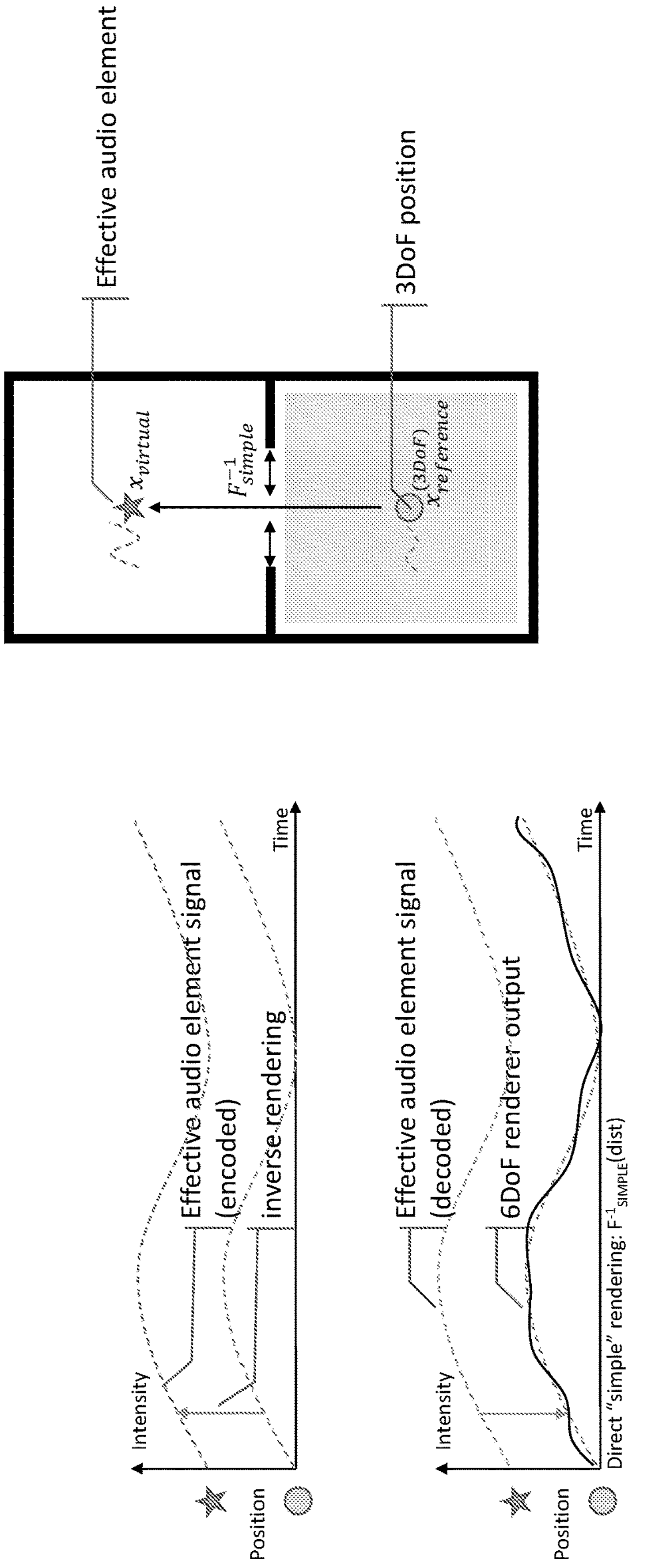

FIG. 13 illustrates exemplary encoder/decoder side processing of a simple rendering mode. The upper panel on the left-hand side illustrates the encoder processing and the lower panel on the left-hand side illustrates the decoder processing. The right-hand side schematically illustrates the inverse rendering of an audio signal at the listener position to a position of an effective audio element.

Figure 14:
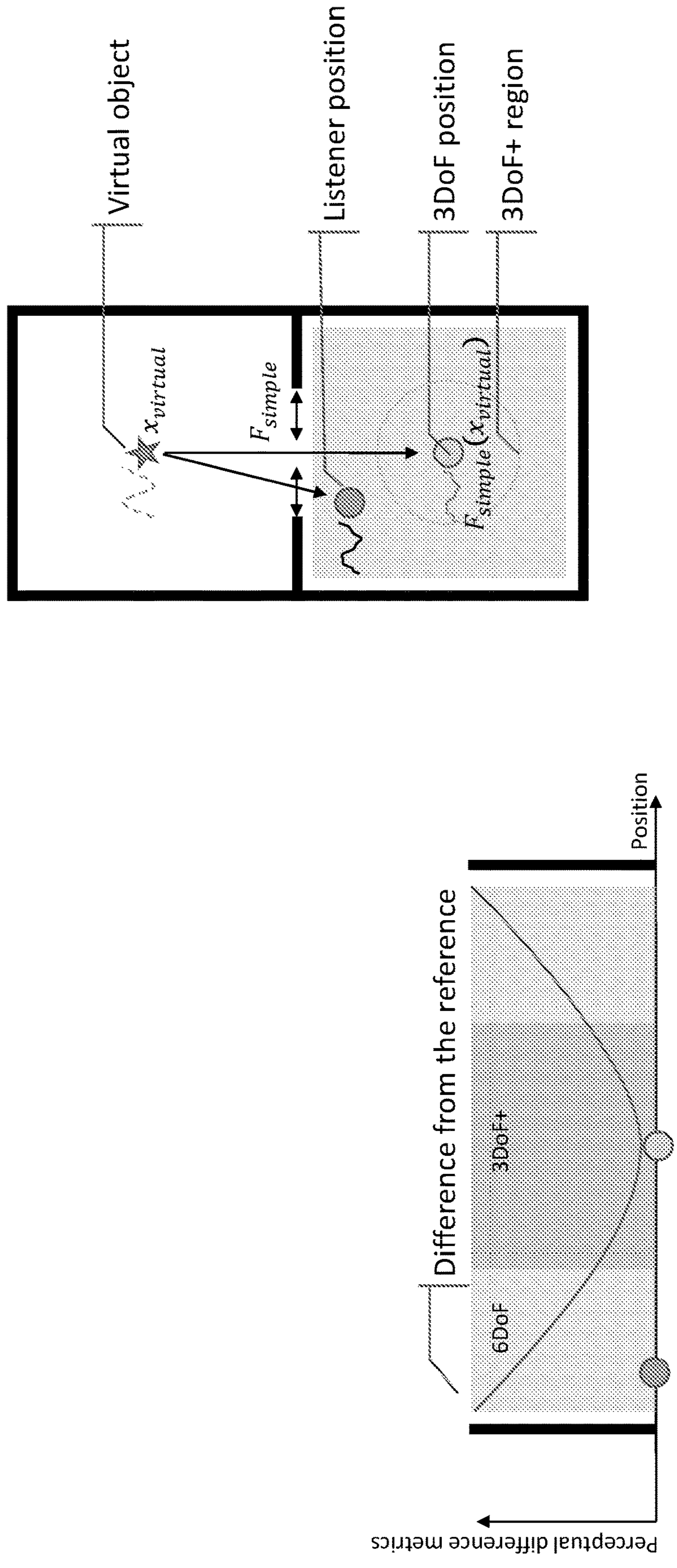

A renderer (e.g., 6DoF renderer) output may approximate a reference audio signal in 3DoF position(s). This approximation may include audio core-coder influence and effects of audio object aggregation (i.e. representation of several spatially distinct audio sources (audio elements) by a smaller number of the virtual objects (effective audio elements)). For example, the approximated reference signal may account for a listener position changing in the 6DoF space, and may likewise represent several audio sources (audio elements) based on a smaller number of virtual objects (effective audio elements). This is schematically illustrated in FIG. 14.

Figure 15:
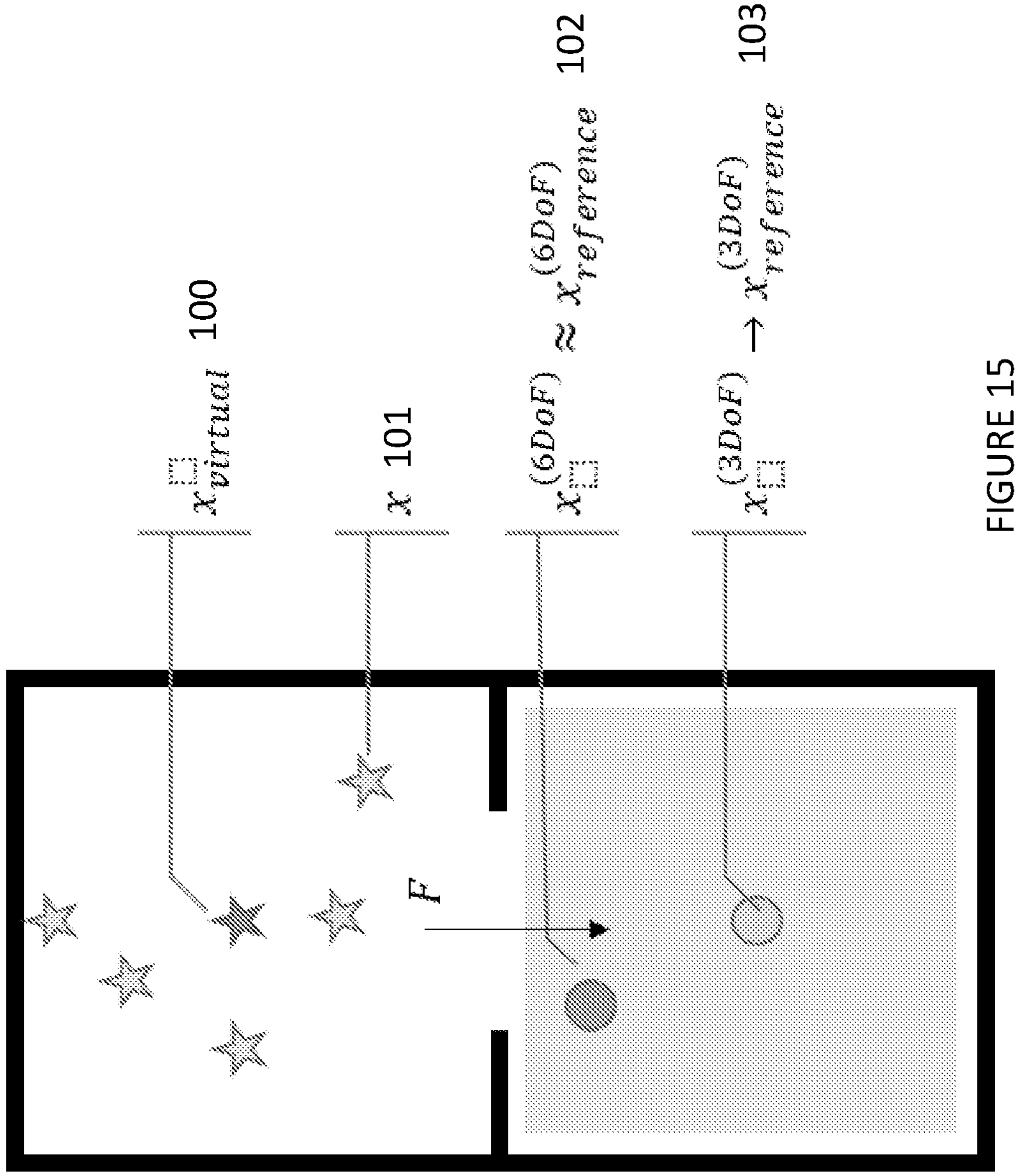

In one example, FIG. 15 illustrates the sound source/object signals (audio elements)×101, virtual object signals (effective audio elements) $x_{virtual}$ 100, desired rendering output in $$3DoF\ 102\ x^{(3DoF)} \to x^{(3DoF)}_{reference},$$

and approximation of the desired rendering $$103 x^{(6DoF)} \approx x^{(6DoF)}_{reference}.$$

Further terminology includes:

3DoF given reference compatibility position(s)∈6DoF space

6DoF arbitrary allowed position(s)∈VR/AR/MR scene $F_{reference}(x)$ encoder determined reference rendering $F_{simple}(x)$ decoder specified 6DoF "simple mode rendering"

$x^{(NDoF)}$ sound field representation in the 3DoF position/6DoF space $$x^{(3DoF)}_{reference}$$

encoder determined reference signal(s) for 3DoF position(s):

$$x^{(3DoF)}_{reference} := F_{reference}(x) \text{ for } 3DoF$$

$$x^{(6DoF)}_{reference}$$

generic reference rendering output $$x^{(6DoF)}_{reference} := F_{reference}(x) \text{ for } 6DoF$$

Given (at the Encoder Side):

audio source signal(s) x reference signal(s) for 3DoF position(s)

$$x^{(3DoF)}_{reference}$$

Available (at the Renderer):

virtual object signal(s) $x_{virtual}$ decoder 6DoF "simple rendering mode"

$$F_{simple} \text{ for } 6DoF,\ \exists F^{-1}_{simple}$$

Problem: define $x_{virtual}$ and $x^{(6DoF)}$ to provide desired rendering output in 3DoF $$x^{(3DoF)} \to x^{(3DoF)}_{reference}$$

approximation of the desired rendering $$x^{(6DoF)} \approx x^{(6DoF)}_{reference}$$

Solution definition of the virtual object(s)

$$x_{virtual} := F^{-1}_{simple}\left(x^{(3DoF)}_{reference}\right),$$

$$\left\| x^{(3DoF)}_{reference} - F_{simple}(x_{virtual}) \text{ for } 3DoF \right\| \to \min$$

6DoF rendering of the virtual object(s) $x^{(6DoF)}:=F_{simple}(x_{virtual})$ for 6DoF The following main advantages of the proposed approach can be identified:

Artistic rendering functionality support: the output of the 6DoF renderer can correspond to the arbitrary (known at the encoder side) artistic pre-rendered reference signal.

Computational complexity: a 6DoF audio renderer (e.g. MPEG-I Audio renderer) can work in the "simple rendering mode" for complex acoustic VR/AR/MR environments.

Coding efficiency: for this approach the audio bitrate for the pre-rendered signal(s) is proportional to the number of the 3DoF positions (more precisely, to the number of the corresponding virtual objects) and not to the number of the original audio sources. This can be very beneficial for the cases with high number of objects and limited 6DoF movement freedom.

Audio quality control at the pre-determined position(s): the best perceptual audio quality can be explicitly ensured by the encoder for any arbitrary position(s) and the corresponding 3DoF+ region(s) in the VR/AR/MR space.

The present invention supports a reference rendering/recording (i.e. "artistic intent") concept: effects of any complex acoustic environment (or artistic rendering effects) can be encoded by (and transmitted in) the pre-rendered audio signal(s).

The following information may be signaled in the bitstream to allow reference rendering/recording:

The pre-rendered signal type flag(s), which enable the "simple rendering mode" neglecting influence of the acoustic VR/AR/MR environment for the corresponding virtual object(s).

Parametrization describing the region of applicability (i.e. 6DoF space) for the virtual object signal(s) rendering.

During 6DoF audio processing (e.g. MPEG-I audio processing), the following may be specified:

How the 6DoF renderer mixes such pre-rendered signals with each other and with the regular ones.

Therefore, the present invention:

is generic in respect to the definition of the decoder specified "simple mode rendering" function (i.e. $F_{simple}$); it can be arbitrary complex, but at the decoder side the corresponding approximation should exist (i.e.

$$\exists F_{simple}^{-1});$$

ideally this approximation should be mathematically "well-defined" (e.g. algorithmically stable, etc.)

is extendable and applicable to generic sound field and sound sources representations (and their combinations): objects, channels, FOA, HOA can take into account audio source directivity aspects (in addition to distance attenuation modelling)

is applicable to multiple (even overlapping) 3DoF positions for pre-rendered signals is applicable to the scenarios where pre-rendered signal(s) are mixed with regular ones (ambience, objects, FOA, HOA, etc.)

allows to define and obtain the reference signal(s)

$$x_{reference}^{(3DoF)}$$

for 3DoF position(s) as:

an output of any (arbitrary complex) "production renderer" applied at the content creator side real audio signals/field recordings (and its artistic modification)

Some embodiments of the present disclosure may be directed to determining a 3DoF position based on:

$$F_{6DoF}(x_{virtual}) \cong F_{SIMPLE}\left(F_{SIMPLE}^{-1}\left(x_{reference}^{(3DoF)}\right)\right).$$

The methods and systems described herein may be implemented as software, firmware and/or hardware. Certain components may be implemented as software running on a digital signal processor or microprocessor. Other components may be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described herein are portable electronic devices or other consumer equipment which are used to store and/or render audio signals.

Example implementations of methods and apparatus according to the present disclosure will become apparent from the following enumerated example embodiments (EEEs), which are not claims.

EEE1 relates to a method for encoding audio data comprising: encoding a virtual audio object signal obtained from at least a pre-rendered reference signal; encoding metadata indicating 3DoF position and a description of 6DoF space; and transmitting the encoded virtual audio signal and the metadata indicating 3DoF position and a description of 6DoF space.

EEE2 relates to the method of EEE1, further comprising transmitting a signal indicating the existence of a pre-rendered type of the virtual audio object.

EEE3 relates to the method of EEE1 or EEE2, wherein at least a pre-rendered reference is determined based on a reference rendering of a 3DoF position and corresponding 3DoF+ region.

EEE4 relates to the method of any one of EEE1 to EEE3, further comprising determining a location of the virtual audio object relative to the 6DoF space.

EEE5 relates to the method of any one of EEE1 to EEE4, wherein the location of the virtual audio object is determined based on at least one of inverse audio rendering or manual specification by a content provider.

EEE6 relates to the method of any one of EEE1 to EEE5, wherein the virtual audio object approximates a pre-defined reference signal for the 3DoF position.

EEE7 relates to the method of any one of EEE1 to EEE6, wherein the virtual object is defined based on:

$$x_{virtual} := F_{simple}^{-1}\left(x_{reference}^{(3DoF)}\right),$$

$$\left\| x_{reference}^{(3DoF)} - F_{simple}(x_{virtual}) \text{ for } 3DoF \right\| \rightarrow \min$$

wherein a virtual object signal is $x_{virtual}$, a decoder 6DoF "simple rendering mode"

$F_{simple}$ for 6DoF, $$\exists F_{simple}^{-1},$$

wherein the virtual object is determined to minimize an absolute difference between a 3DoF position and a simple rendering mode determination for the virtual object.

EEE8 relates to method for rendering a virtual audio object, the method comprising: rendering a 6DoF audio scene based on the virtual audio object.

EEE9 relates to the method of EEE8, wherein the rendering of the virtual object is based on:

$$x^{(6DoF)}:=F_{simple}(x_{virtual}) \text{ for 6DoF}$$

wherein $x_{virtual}$ corresponds to the virtual object; wherein $x^{(6DoF)}$ corresponds to an approximated rendered object in 6DoF; and $F_{simple}$ corresponds to a decoder specified simple mode rendering function.

EEE10 relates to the method of EEE8 or EEE9, wherein the rendering of the virtual object is performed based on a flag signaling a pre-rendered type of the virtual audio object.

EEE11 relates to the method of any one of EEE8 to EEE10, further comprising receiving metadata indicating pre-rendered 3DoF position and a description of 6DoF space, wherein the rendering is based on the 3DoF position and the description of the 6DoF space.

The invention claimed is:

1. A method of decoding audio scene content from a bitstream by a decoder that includes an audio renderer with one or more rendering tools, the method comprising:

receiving the bitstream from an encoder, wherein the bitstream includes one or more effective audio elements, effective audio element information, a rendering mode indication, and listener position area information, wherein the one or more effective audio elements encapsulate an impact of an acoustic environment including two or more of reverberation, echo, direct reflection, or acoustic occlusion, wherein each effective audio element is a virtual audio object, wherein the effective audio element information is indicative of effective audio element positions of the one or more effective audio elements, wherein the effective audio element positions are different from positions of original audio objects, wherein the rendering mode indication is indicative of whether the one or more effective audio elements represent a sound field obtained from pre-rendered audio elements and should be rendered using a predetermined rendering mode, wherein the listener position area information is indicative of a listener position area in the acoustic environment; and in response to the rendering mode indication indicating that the one or more effective audio elements represent the sound field obtained from the pre-rendered audio elements and should be rendered using the predetermined rendering mode, rendering the one or more effective audio elements using the predetermined rendering mode within the listener position area, wherein rendering the one or more effective audio elements using the predetermined rendering mode takes into account the effective audio element information, and wherein the predetermined rendering mode defines a predetermined configuration of the rendering tools for controlling the impact of the acoustic environment on a rendering output.

2. The method according to claim 1, wherein rendering the one or more effective audio elements using the predetermined rendering mode comprises applying sound attenuation modeling in accordance with respective distances between a listener position and an effective audio element position of each effective audio element.

3. The method according to claim 1, wherein the predetermined rendering mode depends on the listener position area.

4. The method according to claim 1, wherein the acoustic environment is a virtual reality (VR), augmented reality (AR), or mixed reality (MR) acoustic environment.

5. A non-transitory computer-readable storage medium including instructions for causing a processor that carries out the instructions to perform the method according to claim 1.

6. An apparatus for audio decoding, the apparatus comprising:

an audio decoder for receiving a bitstream from an encoder, wherein the bitstream includes one or more effective audio elements, effective audio element information, a rendering mode indication, and listener position area information, wherein the one or more effective audio elements encapsulate an impact of an acoustic environment including two or more of reverberation, echo, direct reflection, or acoustic occlusion, wherein each effective audio element is a virtual audio object, wherein the effective audio element information is indicative of effective audio element positions of the one or more effective audio elements, wherein the effective audio element positions are different from positions of original audio objects, wherein the rendering mode indication is indicative of whether the one or more effective audio elements represent a sound field obtained from pre-rendered audio elements and should be rendered using a predetermined rendering mode, wherein the listener position area information is indicative of a listener position area in the acoustic environment; and a renderer for, in response to the rendering mode indication indicating that the one or more effective audio elements represent the sound field obtained from the pre-rendered audio elements and should be rendered using the predetermined rendering mode, rendering the one or more effective audio elements using the predetermined rendering mode within the listener position area, wherein rendering the one or more effective audio elements using the predetermined rendering mode takes into account the effective audio element information, and wherein the predetermined rendering mode defines a predetermined configuration of one or more rendering tools for controlling the impact of the acoustic environment on a rendering output.

7. The method according to claim 1, wherein rendering the one or more effective audio elements using the predetermined rendering mode comprises adding artificial acoustic effects to the one or more effective audio elements.

8. The method according to claim 7, wherein the artificial acoustic effects comprise one or more of the reverberation, the echo, the direct reflection, or the acoustic occlusion.

9. The method according to claim 1, wherein the rendering mode indication comprises one or more control parameters for configuring the one or more rendering tools.

10. The method according to claim 1, wherein the effective audio element information comprises information indicative of respective sound radiation patterns of the effective audio elements, the method further comprising:

determining a gain for each of the effective audio elements based on respective sound radiation patterns; and applying a respective gain to each of the effective audio elements.

11. The method according to claim 10, wherein determining the gain for each of the effective audio elements comprises determining the gain based on an angle between a distance vector from each effective audio element to a listener position within the listener position area and a radiation direction vector indicating a radiation direction of each effective audio element.

12. The method according to claim 1, wherein the rendering mode indication indicates a respective predetermined rendering mode for each of the effective audio elements.

* * * * *